United States Patent [19]
Haldas et al.

[11] 3,772,045
[45] Nov. 13, 1973

[54] ADDITIVE CEMENT COMPOSITIONS AND METHOD

[75] Inventors: Walter J. Haldas; Jesse A. Faust, both of Houston, Tex.

[73] Assignee: Lone Star Cement Corporation, Houston, Tex.

[22] Filed: Apr. 5, 1971

[21] Appl. No.: 131,515

[52] U.S. Cl................................... 106/90, 106/315
[51] Int. Cl............................................. C04b 7/02
[58] Field of Search...................... 106/90, 314, 315, 106/102, 111

[56] References Cited
UNITED STATES PATENTS

| | | | |
|---|---|---|---|
| 3,215,548 | 11/1965 | Vollick | 106/90 |
| 2,880,102 | 3/1959 | Woodard et al. | 106/90 |
| 2,672,424 | 3/1954 | Avery | 106/90 |
| 2,522,707 | 9/1950 | Faber et al. | 106/90 |
| 1,976,133 | 10/1934 | Larmour et al. | 106/102 |
| 2,085,044 | 6/1937 | Roller | 106/102 |

*Primary Examiner*—James E. Poer
*Attorney*—James F. Weiler, Jefferson D. Giller, William A. Stout and Paul L. De Verter, II

[57] ABSTRACT

An additive composition for enhancing the properties of hydraulic cement compositions, and a hydraulic cement composition of enhanced properties, particularly useful in the cementing of wells, and methods of cementing geologic formations traversed by well bores are disclosed. The additive composition comprises a water soluble lignosulfonate or lignosulfonic acid or mixtures thereof, and tartaric acid or a salt of tartaric acid or mixtures thereof, and preferably about 3 parts calcium lignosulfonate and 1 part tartaric acid, although good results are obtained with 1 to 19 parts lignosulfonate or lignosulfonic acid and 19 to 1 parts tartaric acid or a salt of tartaric acid. The hydraulic composition includes a hydraulic cement and preferably about 1–½% of the additive composition based on the weight of the cement; although, good results are obtained with from about 0.10% to about 3%, or higher, for example, for long life slurries. Especially good results are obtained when the hydraulic cement has been pretreated and aged as in our co-pending application filed Jan. 25, 1971, Ser. No. 109,606. The hydraulic cement composition has good viscosity and strength, ideal thickening times, and a reduced amount of mix water may be used thereby increasing the weight of the cement slurry.

The method of performing cementing operations in geologic formations comprises introducing a slurry of the hydraulic cement composition in a well, positioning the cement slurry at cementing depth for bonding and plugging purposes, and allowing the cement slurry to harden.

A number of examples are set forth disclosing the additive and hydraulic cement compositions, methods of making and using them.

12 Claims, No Drawings

ADDITIVE CEMENT COMPOSITIONS AND METHOD

BACKGROUND OF THE INVENTION

The hydraulic cement composition of this invention has special utility in cementing geologic formations traversed by well bores, such as in the drilling of oil and gas wells. Accordingly, the invention is described in connection with such cementing operations; although, other uses of the invention may be made There has been a need for a cement composition that can be used to cement wells drilled from the surface to depths beyond 16,000 feet in search of oil and gas. Such a cement composition ideally should have a thickening time of at least about 3 hours at any specifiied depth, ample strength development, low initial slurry viscosity or consistency, should be compatible with sea water, as a great many wells are cemented offshore where it is advantageous to use sea water as mix water (such as in the Gulf of Mexico), and should have good slurry density without requiring the use of weight materials, although it should be compatible with weight materials so that they may be used, if desired.

The present invention is directed to such a cement composition and method.

The inventors are not aware of any prior patents or publications disclosing, or the use of, the cement compositions and methods of the present invention. Calcium or other liqnosulfonates and lignosulfonic acid, and tartaric acid or various tartrates are known retarders, but to the knowledge of the inventors these have not been combined in accordance with the present invention, which combination provides unexpectedly good results and particularly when combined with the "basic" cement of our co-pending application Ser. No. 109,606, which is an important aspect of the present development. U. S. Pat. No. 2,880,102 granted Mar. 31, 1959, discloses an oil well cement composed of a hydraulic cement, a colloidal clay, a salt of tartaric acid used for the purpose of and in an amount to retard the swelling of the colloidal clay, and calcium lignosulfonate. Such a cement is classified as a "gel cement" or a "bentonite cement," API Bulletin on Oil-Well Cement Nomenclature, 1st Ed., March, 1963 (API Bulletin 10C). Other U. S. patents disclose retarders utilizing tartaric acid, tartrates or lignosulfonates.

SUMMARY

The present invention relates to a cement additive which enhances the properties of hydraulic cement compositions and to hydraulic cement compositions and slurries of enhanced properties particularly useful in the cementing of oil wells, and to methods of cementing geologic formations traversed by well bores in which the cement slurries have good initial viscosity and strength, ideal thickening times and permits a reduced amount of mix water to be used thereby increasing the weight of the cement slurries.

Accordingly, it is an object of the present invention to provide a hydraulic cement composition having enhanced and improved properties.

It is a further object of the present invention to provide an additive composition for hydraulic cement compositions and to cement compositions which imparts enhanced and improved properties for the slurries.

A further object of the invention is the provision of a retarder for use with hydraulic cement slurries used in cementing oil, gas and other wells which provide ideal thickening times at depths down to and beyond 20,000 feet.

A further object of the present invention is the provision of an additive composition for hydraulic cement compositiions and to hydraulic cement compositiions, which when used as cement slurries for cementing formations traversed by a well bore, has a thickening time of at least about three hours, or, preferably from about three to four hours, at depths down to and beyond 20,000 feet, has ample strength development and low viscosity.

A further object of the present invention is the provision of an additive composition for hydraulic cement compositions and to hydraulic cement compositions which when used as slurries permits the use of less mix water, which has a slurry weight of at least about seventeen pounds per gallon, has low viscosity and the other enhanced properties previously set forth.

A further object of the present invention is the provision of such a retarder composition for use in and of hydraulic cement compositions including the retarder composition which is compatible with sea water so that in drilling offshore wells, sea water may be used as the mix water thereby eliminating the expense and trouble of providing "fresh" water as the mix water.

A further object of the present invention is the provision of a method of cementing formations traversed by a well bore utilizing hydraulic cement compositions of the invention.

A further object of the present invention is the provision of a hydraulic cement slurry having low viscosity, good strength, ideal thickening times in depths down to and exceeding 20,000 feet, and to a method of cementing formations traversed by a well with the hydraulic cement slurry.

Other and further objects, features and advantages will be apparent from the following description of presently preferred embodiments of the invention.

DESCRIPTION OF THE PREFERRED EMBODIMENTS

The additive composition of the present invention may be used as a retarder in hydraulic cement slurries for cementing geologic formations at depths down to and exceeding 20.000 feet, particularly when used with the "basic" cement of our co-pending application, as previously mentioned, although it is useful with all hydraulic type cements. This additive composition comprises a water-soluble lignosulfonate, or lignosulfonic acid or mixtures thereof, preferably calcium lignosulfonate, and tartaric acid or a salt of tartaric acid or mixtures thereof, the preferred additive composition being 3 parts calcium lignosulfonate and 1 part tartaric acid, although good results are obtained with 1 to 19 parts of lignosulfonate and 19 to 1 parts tartaric acid or a salt thereof. Especially good results are obtained when the inorganic cement has been pretreated and aged as in our co-pending application, preeviously identified. The preferred amount of the retarder composition added is about 1 ½% based upon the weight of the cement; although about 0.10% to about 3% may be used, or higher, for example, for long life slurries. The resulting hydraulic cement composition when slurried has good viscosity and strength, ideal thickening times and a reduced amount of mix water may be used thereby increasing the weight of the cement slurry. The hydraulic cement slurry is compatible with weight materials which may be used, if desired.

The present invention is applicable to all cementitious systems comprising hydraulic cement. The term "hydraulic cement" is recognized in the art as defining a definite class as set forth in API Bulletin 10c (API Bulletin on Oil-Well Cement Nomenclature, 1st Ed., March 1963), and it is intended to cover all members of this class. Hydraulic cements include, but are not limited to, the portland cements, the natural cements, the white cements, the aluminous cements, the grappier cements, the hydraulic limes and the pozzolanic cements including those derived from industrial slags. The hydraulic cement which is most wiidely used, because of its amenability to low cost production, is portland cement.

Especially good results have been obtained by using the basic cement of our co-pending application, as previously mentioned. This basic cement composition, which has excellent compatibility with the retarder composition of this invention comprises an inorganic cement, as the term is employed herein, intimately mixed with a small amount of water, from about 0.25% up to about 5% by weight of the cement, and preferably from about 0.5% to about 1% water by weight, and aged or cured for at least 30 minutes. The amount of water added should not provide substantial lumping, and if the higher amounts of water are used, preferably a cement slurry including the basic cement composition should be made and used promptly after aging or curing since the higher amounts of water addition increase the thickening time of the cement with storage. The use of about 0.5% water minimizes these disadvantages and permits attainment of ideal thickening time particularly with the retarder composition of the present invention.

The water soluble lignosulfonates include calcium lignosulfonate, ferro lignosulfonate, potassium lignosulfonate, ferro chrome lignosulfonate, sodium lignosulfonate, magnesium lignosulfonate, ammonium lignosulfonate and lithium lignosulfonate. Also as previously mentioned, lignosulfonic acid may be used, and mixtures of the salts of lignosulfonate with each other and with lignosulfonic acid may be used.

The salts of tartaric acid include, calcium tartrate sodium tartrate, potassium tartrate, ammonium tartrate, sodium potassium tartrate, lithium tartrate and potassium bitartrate and as previously mentioned, tartaric acid may be used, and mixtures of the salts of tartaric acid with each other and with tartaric acid may be used.

In addition to the retarder composition of the present invention, various additives used in the cementing of oil wells may be used and added to the cement slurry, such as those listed on pages 18, 19 and 20 of the November-December, 1963 issue of Petroleum Equipment published by Special Associated Publishers, Inc.

The method of making the retarder composition of the present invention comprises mixing the components together within the ranges set forth. The retarder composition is then mixed with inorganic cement in the ranges set forth. Any desired type of mixing can be used which will allow intimate blending of the various components.

A hydraulic cement slurry is then made by mixing the hydraulic cement with the retarder composition with water. Any desired amount of mix water may be used, and advantageously, less mix water may be used than normally used in conventional cements, and particularly when using our "basic" cement, the mix water can be reduced approximately 25%. As previously mentioned, the mix water may be fresh or sea water. Other additives are added to the cement or cement slurry as desired.

The following Examples and Tables are illustrative of the invention in which API Casing or Squeeze Schedules (as specified in API RP 10B) were used, the parts of retarders were based on weight, and the amount of the retarder composition added to the cement was based on the weight of the dry cement.

EXAMPLE I

In this example, a retarder consisting of 3 parts calcium lignosulfonate and 1 part tartaric acid were admixed with an API Class H cement and 40% water to form a cement slurry. The amounts of the retarder composition were varied as set forth in the following Table I in which API Casing and API Squeeze Schedules were used.

TABLE I

Thickening Time of API Class H Cement With Retarder Consisting of 3 Parts Calcium Lignosulfonate and 1 Part Tartaric acid (40% Mix Water)

| Percent retarder | API casing schedules | | | | | | |
|---|---|---|---|---|---|---|---|
| | 8,000 ft. | 10,000 ft. | 12,000 ft. | 14,000 ft. | 16,000 ft. | 18,000 ft. | 20,000 ft. |
| 0 | (13) 2:20 | (13) 1:45 | | | | | |
| 0.1 | (20) 2:40 | (16) 2:00 | (13) 1:50 | | | | |
| 0.2 | (16) 5:30 | (16) 5:10 | (19) 4:10 | (19) 2:40 | (23) 1:10 | | |
| 0.3 | | | (8) 11:30 | (5) 3:10 | (5) 2:30 | | |
| 0.4 | | | | (5) 7:35 | (5) 4:35 | (5) 1:45 | |
| 0.5 | | | | | | (19) 2:10 | |
| 0.6 | | | | | | (5) 2:50 | |
| 0.7 | | | | | | (5) 3:35 | |
| 0.8 | | | | | | | (5) 2:45 |
| 1.0 | | | | | | | (5) 4:00 |
| 1.3 | | | | | | | (5) 5:20 |
| | API squeeze schedules | | | | | | |
| 0 | (14) 1:05 | (12) 1:00 | | | | | |
| 0.1 | (20) 1:55 | (19) 2:05 | | | | | |
| 0.2 | (20) 5:00 | (13) 4:20 | 0:30 | 0:25 | | | |
| 0.3 | | | (12) 3:55 | (13) 2:50 | (11) 2:10 | | |
| 0.4 | | | (12) 8:10 | (11) 5:30 | (13) 2:50 | | |
| 0.5 | | | | | (9) 5:25 | (5) 2:10 | |
| 0.6 | | | | | | (5) 3:00 | |
| 0.7 | | | | | | (5) 4:35 | |

NOTE.—Thickening time to 70 units of consistency. Numbers in parentheses denote initial consistency or viscosity.

From the foregoing Table I, it is seen that beginning with 0.10% retarder, the thickening time was substantially increased and that good thickening times using up to 1.30% retarder were obtained.

EXAMPLE II

In this example, the same retarder and cement were used as in Example I with 32% mix water to form cement slurry. The amounts of retarder and results of the API Casing and API queeze Schedules are set forth in the following Table II.

TABLE II

Thickening Time of API Class H Cement With Retarder Consisting of 3 Parts Calcium Lignosulfonate and 1 Part Tartaric Acid (32% Mix Water)

| Retarder | 8,000 ft. | 10,000 ft. | 12,000 ft. | 14,000 ft. | 16,000 ft. | 18,000 ft. | 20,000 ft. |
|---|---|---|---|---|---|---|---|
| API casing schedules | | | | | | | |
| 0.20 | (13) 1:35 | | | | | | |
| 0.25 | (6) 2:50 | | (8) 1:30 | | | | |
| 0.30 | (12) 3:05 | (8) 2:40 | (5) 2:20 | (7) 1:15 | (5) 2:10 | | |
| 0.35 | | (13) 5:05 | (8) 4:05 | (5) 4:30 | (5) 2:40 | | |
| 0.40 | | (12) 7:10 | | (5) 8:05 | (5) 4:05 | | |
| 0.50 | | | | | | (7) 2:00 | |
| 0.60 | | | | | | (8) 2:50 | |
| 0.70 | | | | | | (5) 3:30 | |
| 0.80 | | | | | | | (5) 2:30 |
| 1.00 | | | | | | | (5) 3:30 |
| 1.30 | | | | | | | (5) 5:10 |
| API squeeze schedules | | | | | | | |
| 0.20 | 0.22 | 0:35 | 0:20 | | | | |
| 0.25 | (10) 1:20 | (5) 0:40 | (8) 0:55 | 0:30 | | | |
| 0.30 | (5) 3:15 | (5) 3:50 | (7) 3:30 | (5) 2:10 | | | |
| 0.35 | | | | (7) 3:35 | | | |
| 0.40 | | | | | (7) 2:20 | | |
| 0.50 | | | | | (5) 3:55 | (5) 1:40 | |
| 0.60 | | | | | (7) 7:05 | (5) 2:10 | |
| 0.70 | | | | | | (5) 3:00 | |

NOTE.—Thickening time to 70 units of consistency. Numbers in parentheses denote initial consistency or viscosity.

From the foregoing Table II, it is seen that with the retarder composition, good thickening times are obtained at various depths with a reduced amount of mix water.

EXAMPLE III

In this example, the same cement was used as in Examples I and II, 40% mix water was used, but the ratio of calcium lignosulfonate to tartaric acid was varied and the amount of retarder was varied as set forth in the following Table III.

TABLE III

Thickening Time of API Class H Cement with Retarder Consisting of Varying Ratio of Calcium Lignosulfonate to Tartaric Acid (40% Mix Water)

| Parts, Calcium Lignosulfonate | Parts Tartaric Acid | % Retarder | API Squeeze Schedule 12,000 ft. | 18,000 ft |
|---|---|---|---|---|
| 100 | 0 | 0.50 | (14) 3:05 | |
| | | 2.00 | | (7) 1:50 |
| | | 3.00 | | (5) 7:55 |
| 19 | 1 | 0.50 | (16) 1:15 | |
| | | 0.55 | (12) 7:30+ | |
| | | 1.00 | | (8) 3:50 |
| 3 | 1 | 0.30 | (5) 2:50 | |
| | | 0.60 | | (6) 2:30 |
| | | 0.65 | | (11) 3:05 |
| 1 | 1 | 0.20 | (11) 1:20 | |
| | | 0.25 | (5) 3:30 | |
| | | 0.30 | (8) 5:10 | |
| | | 0.50 | | (8) 3:05 |
| 1 | 3 | 0.20 | (8) 2:10 | |
| | | 0.25 | (10) 3:45 | |
| | | 0.50 | | (16) 3:25 |
| 1 | 19 | 0.20 | (7) 2:10 | |
| | | 0.25 | (10) 3.15 | |
| | | 0.50 | | (9) 2:20 |
| | | 0.60 | | (5) 4:20 |
| | | 0.70 | | (13) 7:40 |
| 0 | 100 | 0.25 | (8) 3:30 | |
| | | 0.60 | | (8) 5:20 |

NOTE: Thickening Time to 70 Units of Consistency Numbers in parenthesis denote initial consistency or viscosity From the foregoing Table III, it is seen that calcium lignosulfonate and tartaric acid, by themselves, are satisfactory retarders at relatively shallow depths, but would not provide good thickening times at relatively deep depths; whereas, unexpectedly the combination of these two retarders provides good thickening times at deeper depths.

EXAMPLE IV

In this example, the retarder composition and cement of Example I were used with 40% sea water to form a cement slurry. The amount of the retarder composition was varied and API Squeeze Schedules were run with the results as set forth in the following Table IV.

TABLE IV

Thickening Time of API Class H Cement with Retarder consisting of 3 parts Calcium Lignosulfonate and 1 part Tartaric Acid 40% Mix Water (sea water)

| % Retarder | API Squeeze Schedules | | |
|---|---|---|---|
| | 14,000 ft. | 16,000 ft. | 18,000 ft. |
| 0.40 | (5) 1:50 | | |
| 0.50 | (5) 4:45 | | |
| 0.60 | | (5) 3:05 | |
| 0.70 | | | (5) 2:05 |
| 0.80 | | | (5) 3:20 |

NOTE: Thickening Time to 70 Units of Consistency Numbers in parenthesis denote initial consistency or viscosity From the foregoing Table IV, it is seen that the retarder composition is compatible with sea water, and good thickening times were obtained.

EXAMPLE V

In this example, the retarder composition of Example I was used with an API Class A cement mixed with 46% mix water and an API Class C cement mixed with 56% mix water. The amount of the retarder composition was varied and the results of the API Squeeze Schedules are set forth on the following Table V.

TABLE V

Thickening Time of API Class A Cement and Class C Cement with Retarder consisting of 3 parts Calcium Lignosulfonate and 1 part Tartaric Acid API Class A Cement (46% Mix Water)

| % Retarder | API Squeeze Schedules | | |
|---|---|---|---|
| | 14,000 ft. | 16,000 ft. | 18,000 ft. |
| 0.60 | (5) 2:10 | | |
| 0.70 | (5) 5:05 | (8) 1:10 | |
| 0.80 | | (5) 3:10 | |
| 1.20 | | | (5) 2:55 |
| 1.30 | | | (5) 3:45 |

API Class C Cement (56% Mix Water)

| | API Squeeze Schedules | | |
|---|---|---|---|
| | 14,000 ft. | 16,000 ft. | 18,000 ft. |
| 0.80 | (5) 3:20 | | |
| 1.00 | | (5) 3:40 | |
| 1.40 | | | (5) 4:50 |

NOTE: Thickening Time to 70 Units of Consistency Numbers in parenthesis denote initial consistency or viscosity From the foregoing Table V, it is seen that good results are obtained by using various amounts of the retarder composition at various depths with API Class A and Class C cements.

EXAMPLE VI

In this example, API Squeeze Schedules were run on the retarder composition, cement and mix water of Example I, and sodium lignosulfonate and ferro chrome lignosulfonate were each substituted for calcium lignosulfonate. The amount of the retarder composition and results obtained were as set forth in the following Table VI.

TABLE VI

Thickening Time of API Class H Cement with Retarder consisting of Lignosulfonate Salts and Tartaric Acid in a ratio of 3:1, respectively (40% Mix Water)

| Lignosulfonate | % Retarder | API Squeeze Schedules | |
|---|---|---|---|
| | | 12,000 ft. | 18,000 ft. |
| Calcium | 0.30 | (5) 2:50 | |
| | 0.60 | | (6) 2:30 |
| Sodium | 0.65 | | (11) 3:05 |
| | 0.30 | (5) 2:30 | |
| | 0.50 | (7) 5:20 | |
| | 0.65 | | (10) 1:50 |
| | 1.00 | | (8) 5:30 |
| Ferro Chrome | 0.50 | (17) 5:15 | |
| | 1.50 | | (5) 4:40 |

NOTE: Thickening Time to 70 Units of Consistency Numbers in parenthesis denote initial consistency or viscosity From the foregoing Table VI, it is seen that various lignosulfonates may be combined with tartaric acid with good results.

EXAMPLE VII

In this example, the retarder, cement and 40% mix water were used to form a cement slurry as in Example I except that sodium, potassium and ammonium salts of tartaric acid were substituted for tartaric acid, the results of which are set forth in the following Table VII.

TABLE VII

Thickening Time of API Class H Cement with Retarder consisting of 3 parts Calcium Lignosulfonate and 1 part salt of Tartaric Acid (40% Mix Water)

| Tartrate | % Mixture | API Squeeze Schedule 12,000 ft. |
|---|---|---|
| Calcium | 0.40 | (18) 2:10 |
| | 0.50 | (8) 5:10+ |
| Sodium | 0.30 | (6) 3:10 |
| Potassium | 0.30 | (9) 3:40 |
| Ammonium | 0.30 | (5) 2:40 |
| | 0.35 | (10) 4:50 |

NOTE: Thickening Time to 70 Units of Consistency Numbers in parenthesis denote initial consistency or viscosity From the foregoing Table VII, it is seen that good results are obtained with various salts of tartaric acid.

EXAMPLE VIII

In this example, an API Class H cement pretreated with 0.5% water and aged for at least 30 minutes was used in place of the cement in Example I. The results of the standard API Casing and Squeeze Schedules are set forth in the following Table VIII.

TABLE VIII

Thickening Time of API Class H Cement Pretreated With 0.5% Water With Retarder Consisting of 3 Parts Calcium Lignosulfonate and 1 Part Tartaric Acid (40% Mix Water)

| Retarder | API casing schedule | | | | | | |
|---|---|---|---|---|---|---|---|
| | 8,000 ft. | 10,000 ft. | 12,000 ft. | 14,000 ft. | 16,000 ft. | 18,000 ft. | 20,000 ft. |
| .0 | (12) 3:50 | (5) 2:35 | (10) 1:20 | | | | |
| .05 | | (9) 2:55 | (12) 2:20 | | | | |
| .10 | | (6) 5:15 | (5) 3:50 | (5) 2:15 | (5) 1:05 | | |
| .15 | | | | (5) 4:50 | (5) 1:40 | | |
| .20 | | | | | (5) 3:05 | | |
| .30 | | | | | (8) 5:00+ | | |
| .40 | | | | | | (5) 1:30 | |
| .60 | | | | | | (5) 2:20 | |
| .70 | | | | | | (8) 2:55 | |
| .75 | | | | | | (6) 3:10 | |
| .80 | | | | | | | (5) 1:45 |
| 1.10 | | | | | | | (5) 2:30 |
| 1.40 | | | | | | | (5) 3:30 |

| | API squeeze schedule | | | | | | |
|---|---|---|---|---|---|---|---|
| .05 | (12) 1:35 | (6) 1:05 | | | | | |
| .05 | (10) 2:20 | (11) 2:05 | (14) 1:10 | | | | |
| .10 | (13) 4:50 | (7) 4:05 | (5) 2:05 | (6) 1:00 | | | |
| .15 | | | (7) 3:55 | (5) 1:40 | | | |
| .20 | | | | (5) 3:25 | | | |
| .30 | | | | | (5) 2:30 | | |
| .35 | | | | | (5) 3:25 | | |
| .40 | | | | | (5) 4:40 | | |
| .60 | | | | | | (16) 1:30 | |
| .70 | | | | | | (13) 1:55 | |
| .80 | | | | | | (5) 3:00 | |

NOTE.—Thickening time to 70 units of consistency. Numbers in parentheses denote initial consistency or viscosity.

From the foregoing Table VIII is seen that good thickening times were obtained at various depths and at quite deep depths.

In the foregoing examples, standard API Casing and Squeeze schedules were used. In the following examples, temperatures were increased to simulate greater depths.

EXAMPLE IX

In this example, a Class H cement was used with 2% of the retarder of Example I and 40% mix water. The temperature was raised to 360°F in 90 minutes and the pressure was 18,000 psig. The thickening time of the cement slurry to 70 units of consistency was 5 hours and 25 minutes and it had an initial consistency or viscosity of 8 units.

EXAMPLE X

This example is the same as that of Example IX except that 2—½% of the retarder composition was used and the temperature was raised to 380°F in 90 minutes. The cement slurry had an initial consistency or viscosity of 5 units and its thickening time to 70 units of consistency was 3 hours and 50 minutes.

EXAMPLE XI

This example is the same as that of Examples IX and X except that 3% of the retarder composition was used and the temprature was raised to 400°F in 90 minutes. The cement slurry had an initial consistency or viscosity of 5 units and its thickening time to 70 units of consistency was 2 hours and 50 minutes.

From Examples IX, X and XI it is seen that up to 3% of the retarder composition can be used with satisfactory results. Also, as previously mentioned higher amounts of the retarder composition may be used, particularly, for long life slurries where longer setting times are desired.

Other of the water soluble lignosulfonates or lignosulfonic acid or mixtures thereof and other of the tartrates or tartaric acid or mixtures thereof may be substituted in the foregoing examples and tables with good results. Also fresh or sea water may be used in he foregoing examples and tables. Also, any of the hydrualic cements may be used in the various examples and tables. The optimum amounts of the components of the retarder composition and the optimum amount of a particular retarder composition to be added to a particular cement with either fresh or sea water for the particular well conditions and results desired may be determined readily by simple experimentation. Accordingly, in order not to unduly lengthen the description no more examples are deemed necessary or are given.

In cementing wells in accordance with the invention, the retarder composition is admixed with the desired hydraulic cement in the proportions set forth and then the cement and retarder are admixed with water, although the retarder composition may be added to the cement and water mixture or may be added to the water and then the water with the retarder added admixed with the cement. The amount of water will depend upon the particular hydraulic cement used. The cement slurry thus formed is then introduced into the well and pumped down the well into the space to be cemented, and the hydraulic cement slurry is maintained in the space to be cemented until the cement sets. The retarder composition may be prepared at or near the well site, if desired, or may be previously prepared and added to the hydraulic cement, cement-water mix, or water at the well site, as desired. Advantageously, however, the retarder composition may be added to the hydraulic cement and admixed therewith well in advance, and then mixed with additional additives and desired amounts of mix water to form the hydraulic cement slurry.

Accordingly, the present invention is well adapted and suited to attain the objects and ends and has the advantages and features mentioned as well as others inherent therein.

While presently preferred embodiments and examples have been given for the purposes of disclosure, many changes may be made therein and the invention may be applied to additional uses which are within the spirit of the invention as defined by the scope of the appended claims.

What is claimed is:

1. A hydraulic cement composition consisting of
   a hydraulic cement, and
   about 0.10% to at least about 3.00% of a retarder composition based on the weight of the dry cement consisting essentially of
      from about 1 part to about 19 parts by weight of a member selected from the group consisting of a water soluble lignosulfonate, lignosulfonic acid and mixtures thereof, and
      from about 1 part to about 19 parts by weight of a member selected from the group consisting of tartaric acid, a salt of tartaric acid and mixtures thereof.

2. The hydraulic cement composition of claim 1 where
   the lignosulfonate is calcium lignosulfonate, and
   the selected member is tartaric acid.

3. The hydraulic cement composition of claim 1 where the retarder composition consists essentially of
   about 3 parts calcium lignosulfonate and about 1 part tartaric acid.

4. A hydraulic cement composition consisting of
   a substantially dry hydraulic cement free of substantial lumping intimately mixed with a small amount of liquid water and aged for a period of at least about 30 minutes, and
   about 0.10% to at least about 3.00% of a retarder composition based on the weight of the dry cement consisting essentially of
      from about 1 part to about 19 parts by weight of a member selected from the group consisting of a water soluble lignosulfonate, lignosulfonic acid and mixtures thereof, and
      from about 1 part to about 19 parts by weight of a member selected from the group consisting of tartaric acid, a salt of tartaric acid and mixtures thereof.

5. The hydraulic cement composition of claim 4 where
   the lignosulfonate is calcium lignosulfonate, and
   the selected member is tartaric acid.

6. The hydraulic cement composition of claim 4 where the retarder composition consists essentially of
   about 3 parts calcium lignosulfonate and about 1 part tartaric acid.

7. A hydraulic cement slurry including,
   the hydraulic cement composition of claim 1,
   the retarder composition being present in an amount effective to provide a thickening time of the order of at least about 3 hours at cementing depth.

8. The hydraulic cement slurry of claim 7
where the lignosulfonate is calcium lignosulfonate, and
where the selected member is tartaric acid.

9. The hydraulic cement slurry of claim 7
where the retarder composition consists essentially of
about 3 parts calcium lignosulfonate, and
about 1 part tartaric acid.

10. A hydraulic cement slurry including,
a hydraulic cement prepared by intimately mixing the hydraulic cement with a small amount of liquid water and aging for a period of at least about 30 minutes before slurrying, and
a retarder composition consisting essentially of from about 1 part to about 19 parts by weight of a member selected from the group consisting of a water soluble lignosulfonate, lignosulfonic acid and mixtures thereof, and from about 1 part to about 19 parts by weight of a member selected from the group consisting of tartaric acid, a salt of tartaric acid and mixtures thereof,
the retarder composition being present in an amount effective to provide a thickening time of the order of at least about 3 hours at cementing depth.

11. The hydraulic cement slurry of claim 10
where the lignosulfonate is calcium lignosulfonate, and
where the selected member is tartaric acid.

12. The hydraulic cement slurry of claim 10 where the retarder composition consists essentially of
about 3 parts calcium lignosulfonate, and about 1 part tartaric acid.

* * * * *

UNITED STATES PATENT OFFICE
CERTIFICATE OF CORRECTION

Patent No. 3,772,045          Dated Nov. 13, 1973

Inventor(s) Walter J. Haldas, Jesse A. Faust

It is certified that error appears in the above-identified patent and that said Letters Patent are hereby corrected as shown below:

Column 2, line 48, cancel "20.000" and insert "20,000"

Table II, heading "Retarder", change to "% Retarder"

Table VIII, heading "Retarder", change to "% Retarder"

Table VIII, heading "API squeeze schedule", column 1, change ".05" to ".0".

Signed and sealed this 16th day of July 1974.

(SEAL)
Attest:

McCOY M. GIBSON, JR
Attesting Officer

C. MARSHALL DANN
Commissioner of Patents